US007076564B2

(12) United States Patent
To et al.

(10) Patent No.: US 7,076,564 B2
(45) Date of Patent: Jul. 11, 2006

(54) METHOD AND APPARATUS FOR DETERMINING AND RESOLVING MISSING TOPOLOGY FEATURES OF A NETWORK FOR IMPROVED TOPOLOGY ACCURACY

(75) Inventors: Hing Wing To, London (GB); Christopher Appleton, Kent (GB)

(73) Assignee: Micromuse Ltd., London (GB)

( * ) Notice: Subject to any disclaimer, the term of this patent is extended or adjusted under 35 U.S.C. 154(b) by 705 days.

(21) Appl. No.: 09/955,472

(22) Filed: Sep. 17, 2001

(65) Prior Publication Data
US 2004/0193705 A1    Sep. 30, 2004

(51) Int. Cl.
*G06F 15/16*    (2006.01)

(52) U.S. Cl. ............... 709/238; 709/248; 370/389; 714/707

(58) Field of Classification Search ........... 709/238, 709/242, 224, 227, 225, 248, 251; 370/422, 370/254, 392, 389; 714/707
See application file for complete search history.

(56) References Cited

U.S. PATENT DOCUMENTS

| | | | |
|---|---|---|---|
| 5,198,805 A | 3/1993 | Whiteside et al. ..... 340/825.06 |
| 5,276,789 A | 1/1994 | Besaw et al. ............... 395/140 |
| 5,343,471 A | 8/1994 | Cassagnol .................. 370/85.13 |
| 5,371,744 A * | 12/1994 | Campbell et al. ........... 709/238 |
| 5,375,055 A | 12/1994 | Togher et al. ............... 364/408 |
| 5,528,516 A | 6/1996 | Yemini et al. ............ 364/551.1 |
| 5,568,471 A | 10/1996 | Hershey et al. ................ 370/17 |
| 5,568,613 A | 10/1996 | Futral .................... 395/200.02 |
| 5,571,396 A | 11/1996 | Cormier et al. .............. 204/418 |
| 5,646,939 A | 7/1997 | Lindeborg et al. .......... 370/258 |
| 5,684,959 A | 11/1997 | Bhat et al. ............. 395/200.11 |
| 5,694,547 A | 12/1997 | Subramanian et al. . 395/200.11 |
| 5,727,165 A | 3/1998 | Ordish et al. ............... 395/237 |
| 5,729,685 A | 3/1998 | Chatwani et al. ...... 395/200.11 |
| 5,742,820 A * | 4/1998 | Perlman et al. ............. 707/201 |

(Continued)

FOREIGN PATENT DOCUMENTS

WO    WO 98/21856    5/1998

(Continued)

OTHER PUBLICATIONS

International Search Report PCT/GB02/04188 of May 19, 2003.

*Primary Examiner*—Khanh Quang Dinh
(74) *Attorney, Agent, or Firm*—Brown Raysman Millstein Felder & Steiner LLP (57) ABSTRACT

The present invention describes a method and apparatus for resolving anomalies within a network topology map that typically occur when a derived topology map fails, for a variety of reasons, to include devices resident on the network. The method of the present invention discovers missing devices by identifying a conflicting link within a received topology map, the conflicting link comprising a source and one or more conflicting destinations. The conflicting link is resolved through the use of one or more virtual devices within the topology map. The conflicting link is replaced with a link to a virtual device based upon the resolution of the conflicting link, thereby eliminating the anomaly in the topology map. The step of resolving the conflicting link may also comprise the steps of determining a number of conflicting destinations from the source of the conflicting link, resolving the source of the conflicting link, and resolving the conflicting destination. In order to reduce the number of virtual devices inserted to the topology, the method may further include identifying a link between two virtual devices and merging the virtual devices.

12 Claims, 11 Drawing Sheets

U.S. PATENT DOCUMENTS

| | | | |
|---|---|---|---|
| 5,761,502 A | 6/1998 | Jacobs | 395/614 |
| 5,774,377 A | 6/1998 | Eidson et al. | 364/550 |
| 5,819,028 A | 10/1998 | Manghirmalani et al. | 395/185.1 |
| 5,933,416 A | 8/1999 | Schenkel et al. | 370/254 |
| 5,940,392 A | 8/1999 | Lo et al. | 370/392 |
| 5,949,759 A | 9/1999 | Cretegny et al. | 370/250 |
| 5,950,177 A | 9/1999 | Lupien et al. | 705/37 |
| 5,964,841 A * | 10/1999 | Rekhter | 709/242 |
| 6,003,074 A | 12/1999 | Vasconcellos | 709/220 |
| 6,006,016 A | 12/1999 | Faigon et al. | 395/185.01 |
| 6,012,152 A | 1/2000 | Douik et al. | 714/26 |
| 6,047,279 A | 4/2000 | Barrack et al. | 706/60 |
| 6,262,976 B1 * | 7/2001 | McNamara | 370/254 |
| 6,363,077 B1 * | 3/2002 | Wong et al. | 370/422 |
| 6,493,341 B1 * | 12/2002 | Datta et al. | 370/392 |
| 6,834,310 B1 * | 12/2004 | Munger et al. | 709/232 |
| 6,839,759 B1 * | 1/2005 | Larson et al. | 709/228 |
| 6,907,473 B1 * | 6/2005 | Schmidt et al. | 709/248 |

FOREIGN PATENT DOCUMENTS

| | | | |
|---|---|---|---|
| WO | WO 00/36790 | 6/2000 | 12/24 |

* cited by examiner

METHOD AND APPARATUS FOR DETERMINING AND RESOLVING MISSING TOPOLOGY FEATURES OF A NETWORK FOR IMPROVED TOPOLOGY ACCURACY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates generally to systems and methods for determining the topology of computer networks. More particularly, the present invention relates to methods for identifying and resolving missing devices in a topology of a computer network.

There are many existing systems for determining the topology features of a network. Topology is generally concerned with the physical interconnections between devices in a computer network. This is referred to as Layer 2 or the Data Link Layer, which is one of several layers comprising the multi-layered communication model known as Open Systems Interconnection (OSI). In a network, devices may redirect data messages at the layer 2 level using the destination Media Access Control Address to determine where to direct the message. The Data Link Layer ensures that an initial connection has been achieved between devices, divides output data into frames, and handles the acknowledgements from a receiver that the data arrived successfully. A switch is one example of a Layer 2 device.

Examining the address of neighboring nodes on a network may also be used to derive the topology features of a network. This is referred to as Layer 3, or the Network Layer, of the OSI model. Layer 3 is concerned with knowing the address of the neighboring nodes in a network, selecting routes based thereupon, and providing quality of service. A router is an example of a Layer 3 device, although some newer switches perform Layer 3 functions, and the Internet Protocol address is a Layer 3 address.

Figure 1:
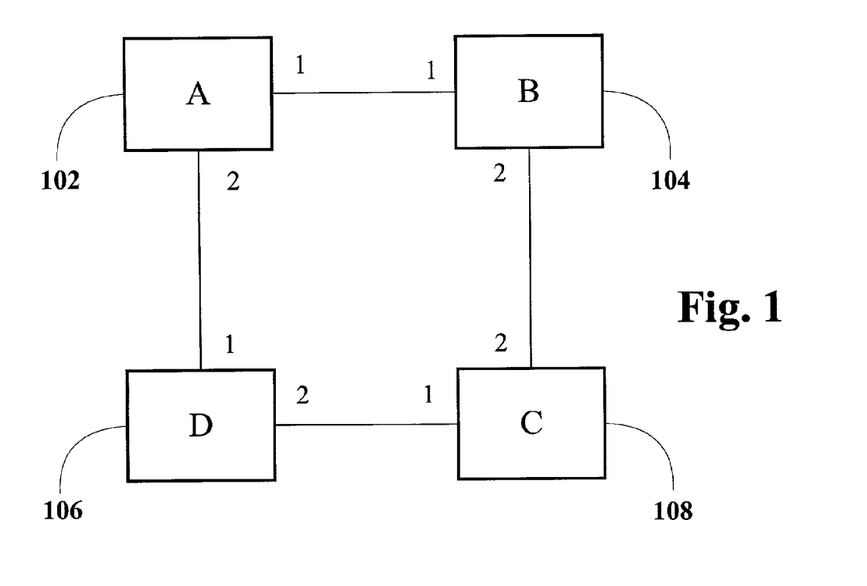
FIG. 1 is a block diagram presenting a topology map comprising several devices and the interconnections therebetween identified by port number.

Examining the devices attached to each port of a device derives Layer 2 topology. FIG. 1 presents the Layer 2 topology of an exemplary network comprised of devices A 102, B 104, C 108, and D 106. Each device on the network (link domain) has two ports, each connected to a port on another device. Layer 2 devices are identified by a Media Access Control (MAC) address. The MAC address is imprinted on a network controller at the point of manufacture, and is associated with each port on a device. These physical interconnections, identified by source and destination MAC addresses, are recorded in a master link table the stores the source name, source port, destination name, and destination port. Table 1, which follows, presents the master link table for the network presented in FIG. 1:

TABLE 1

| Source name | Source port | Destination name | Destination port |
| --- | --- | --- | --- |
| A | 1 | B | 1 |
| A | 2 | D | 1 |
| B | 1 | A | 1 |
| B | 2 | C | 2 |
| C | 2 | B | 2 |
| C | 1 | D | 2 |
| D | 2 | C | 1 |
| D | 1 | A | 2 |

Using the master link table presented above in Table 1, existing topology systems are capable of constructing a graphical representation of the network's topology (FIG. 1). Similar techniques are also available for deriving network topology through utilizing Layer 3 data.

While it is know in the art to obtain the topology features using Layer 2 and Layer 3 addresses, existing topology systems and methods fail to account for situations where knowledge of a network is missing. This can occur for a variety of reasons. For example, incorrectly configuring the security settings of a device may result in the device not responding to a variety of requests. Likewise, the device may not support the discovery mechanism being employed by the topographer or the device may be owned by a third party who has denied access to the discovery features of the device.

Systems that do not recognize the existence of missing devices when deriving the topology of a network result in topologies containing anomalies. By identifying when there are missing devices on a network and removing the anomalies associated with them, systems that subsequently use the topology can be simplified. Without accounting for anomalies, subsequent system must necessarily be more complex as they must provide for business logic to handle the exceptional cases caused by the anomalies. Furthermore, by identifying missing devices it is possible to alert a user to the issue, enabling the problem to be manually addressed if the situation requires it.

Figure 2:
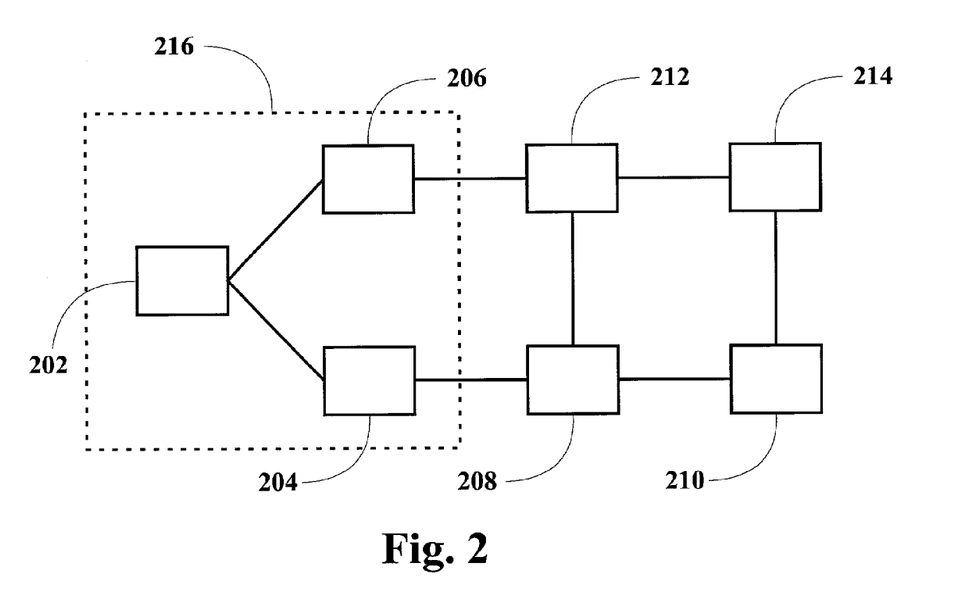
FIG. 2 is a block diagram presenting a topology map comprising a sub-topology containing an anomaly.

An exemplary network topology containing anomalies, as discussed above, is presented in FIG. 2. The network comprises a plurality of devices, 202, 204, 206, 208, 210, 212, 214. Each line represents the physical interconnections between ports of the devices, e.g., between 210 and 214 and between 210 and 208. An anomaly is generated when a device 202 is depicted based on retrieved or generated topology data as being physically connected to two distinct devices, 204 and 206, over a single port. The topology may be broken down into sub-topologies 216 wherein each sub-topology represents a domain of Layer 2 devices. By limiting the scope of analysis to a sub-topology, or interconnection between two or more sup-topologies, the task of identifying missing devices is simplified.

Although a number of techniques have been developed to determine devices missing from a network topology, they all have significant drawbacks. U.S. Pat. No. 5,708,772, entitled "Network Topology Determination by Dissecting Unitary Connections and Detecting Non-responsive Nodes", presents a solution to determine missing Layer 2 devices whereby every Layer 2 device that traverses an unknown device needs to be aware of every other device connected to the unknown device. For example, assume the following topology presented in Table 2, comprising devices A, B, C, and D, where device B is an unknown device:

TABLE 2

According to the system and method described, device A must be aware of devices C and D. Similarly, device D must be aware of devices A and C. Furthermore, transitive links must be identified and resolved in order for the system and method to function properly, e.g., if device C is further connected to device E, then device A must be aware of device E. This, however, is not always the case, which has the potential to result in erroneous topologies being generated.

Another solution to the problem has been proposed by U.S. Pat. No. 5,926,462, entitled "Method of Determining Topology Features of a Network of Objects Which Compares the Similarity of the Traffic Sequences/Volumes of a Pair of Devices". According to this method, topology is derived by analyzing traffic profiles; changes in profiles reflect changes in topology. Unfortunately, this method requires constant monitoring of traffic patterns over an extended period of time, unnecessarily consuming network resources.

There is thus a need for a system and method to identify and resolve missing devices in a network topology. The invention described herein adopts an approach of identifying and resolving the anomalies by inserting a "virtual device" into the topology to represent the missing device. The system and method of the present invention further reduces the number of such virtual devices and ensures that no anomalies exist between the virtual devices themselves.

BRIEF SUMMARY OF THE INVENTION

The present invention is operative to provide a data structure populated with data representing the physical links between devices in a computer network, the data representing devices missing from a received topology map with virtual devices.

The present invention provides a system and method for determining devices missing from a topology map without requiring each device to have any knowledge of the network.

The present invention further provides for virtual ports on a virtual device, each port allocated to an individual device connecting to the virtual device.

In accordance with embodiments of the present invention, a method is provided for resolving anomalies within a network topology map. The method includes identifying a conflicting link within a received topology map, the conflicting link comprising a source and one or more conflicting destinations, resolving the conflicting link through the use of one or more virtual devices within the topology map, and replacing the conflicting link with a link to a virtual device based upon the resolution of the conflicting link.

In some embodiments, resolving the conflicting link involves resolving the source of the conflicting link and resolving the conflicting destination. In further embodiments, identifying the conflicting link involves locating two or more entries in a link table showing the source to be linked to two or more different destinations. Entries in the link table having the same source may be grouped together into a conflict group. Replacing the conflicting link with a link to the virtual device may involve removing the conflicting link from the link table and inserting the link to the virtual device in a virtual link table. The method may further involve generating a virtual link table for storing one or more links to virtual devices.

Resolving the conflicting link may involve first determining whether the source or a destination in the conflicting link is linked to a first virtual device and replacing the conflicting link with a link to a virtual device only if neither the source nor a destination is linked to the first virtual device. Determining whether the source or destination is linked to a virtual device may involve first determining whether the source is linked to a virtual device then determining whether a destination in the conflicting link is linked to a virtual device. If the source is linked to a first virtual device, the source is replaced with the first virtual device. If a destination in the conflicting link is linked to a first virtual device, a link is created from the source to the first virtual device if the source in the conflicting link is not a virtual device.

In alternative embodiments, other resolution sequences may be used to resolve conflicting links. For example, devices may be traversed in any given sequence and decisions made based on any unresolved source and destination conflict whether to insert a virtual link to a virtual device. Since virtual devices are merged at the end of the process, the resulting virtual links to virtual devices should come out substantially or exactly the same. However, certain analysis sequences such as those described herein are more efficient, require fewer iterations and achieve the resulting virtual link table more quickly than others.

In accordance with further embodiments of the present invention, a computer readable medium is provided for storing a data structure representing a virtual link table. The data structure contains one or more entries showing a link between a source device in a network and a first virtual device, the source device being identified in a received topology map of a network and the first virtual device not being identified in the received topology map. The data structure further contains one or more entries showing a link between a destination device in the network and the first virtual device, the destination device being identified in the received topology map. The virtual link table data structure is used by an executable program to display an improved topology map of the network.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

With reference to FIGS. 3*a* through 12, preferred embodiments of the instant invention are presented. The present invention comprises a computer system, comprising a programmable microprocessor and executing software to execute the methods for determining missing devices from a network topology. A block diagram presenting the modifications made to a topology map received by a programmable microprocessor executing methods of the instant invention is present in FIGS. 3*a* through 3*c*. An exemplary system and method for generating a topology map for use with the present invention is described in U.S. Pat. No. 6,108,702 ("the '702 patent"), entitled "Method and Apparatus for Determining Accurate Topology Features of a Network", which is hereby incorporated by reference in its entirety.

Figure 3A:
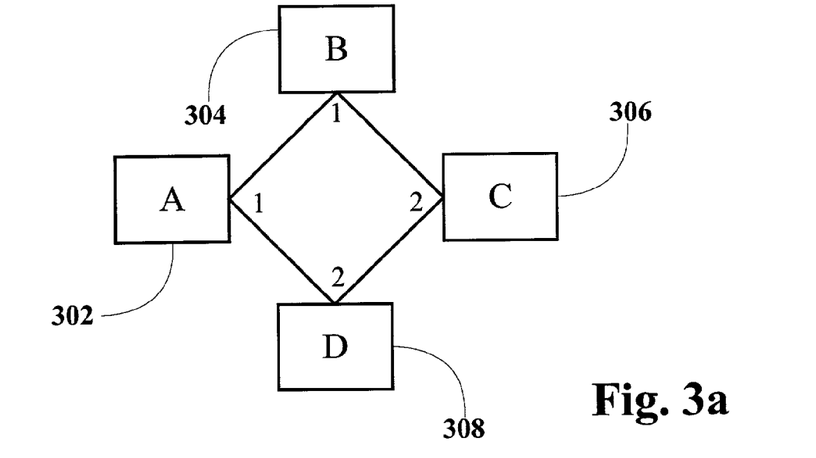
FIGS. 3a through 3c are a series of block diagrams presenting a topology map comprising a plurality of anomalies and the use of a virtual device to resolve the anomalies, according to one embodiment of the present invention.

Turning to FIG. 3*a*, the network comprises a number of anomalies in that each device is reported as having two devices connected to single port, e.g., Device D, port 2 208 is connected to Device C, port 2 306 and Device A, port 1 302. Table 3 presents the main link table for this anomalous topology:

TABLE 3

| Source name | Source port | Destination name | Destination port |
|---|---|---|---|
| A | 1 | B | 1 |
| A | 1 | D | 2 |
| B | 1 | A | 1 |
| B | 1 | C | 2 |
| C | 2 | B | 1 |
| C | 2 | D | 2 |
| D | 2 | C | 2 |
| D | 2 | A | 1 |

Each anomaly is resolved by ensuring that each port comprises at most one connection. This is achieved through the use of a virtual device 310. The direct connection from Device B 304 to both Device A 302 and Device C 306 is resolved by generating a virtual device, which comprises one or more virtual ports, and linking Device B, port 1 304 with port 1 of the virtual device 310. The method further determines that because all communication to Device B flows through Device V 310, links must be generated to Device B 304 via Device V 310. Virtual ports 2 and 3 are generated on the virtual device 310, and linked to Device A, port 1 302 and Device C, port 2 306, respectively.

At this point of the process, a virtual link table has been generated in memory of the computer system and entries have been generated to track the links between the virtual device 310 and devices A 302, B 304, and C 306. Table 4 presents a link table representing the present topology:

TABLE 4

| Source name | Source port | Destination name | Destination port |
|---|---|---|---|
| B | 1 | V | 1 |
| A | 1 | V | 2 |
| A | 2 | D | 2 |
| C | 2 | V | 3 |
| C | 2 | D | 2 |
| D | 2 | A | 1 |
| D | 2 | C | 2 |
| V | 1 | B | 1 |
| V | 2 | A | 1 |
| V | 3 | C | 2 |

Figure 3B:
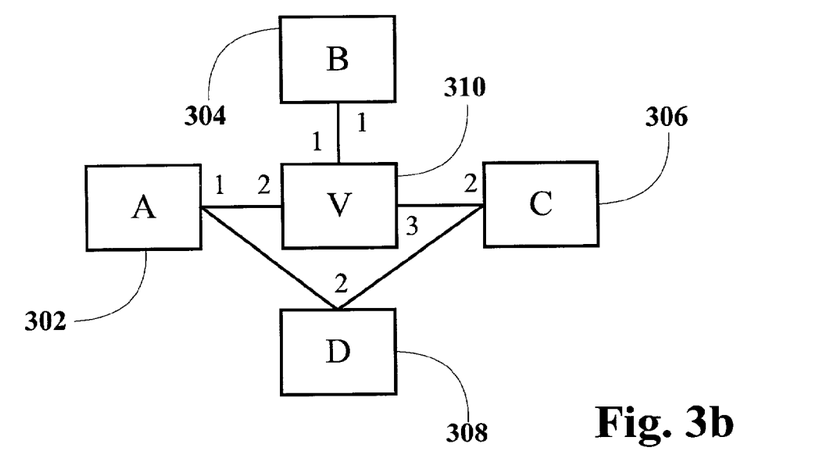
Figure 3C:
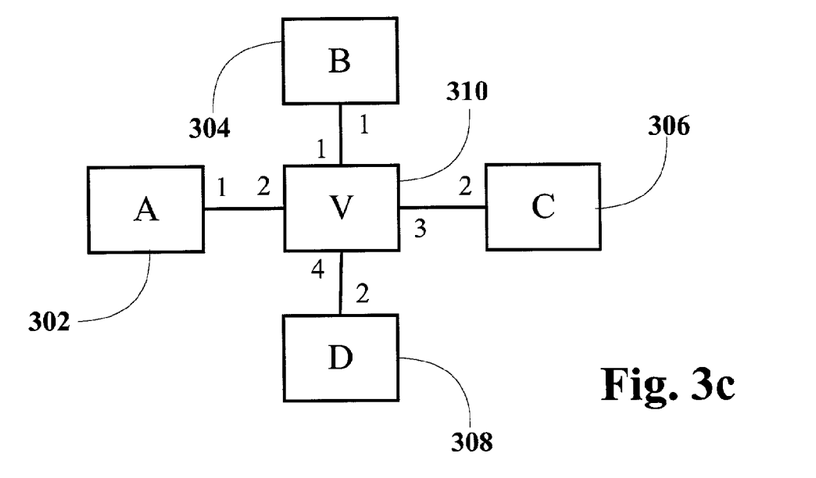

As shown by FIG. 3*b*, the addition of a virtual device 310, and the generation of three virtual ports, resolves the topology anomaly between Devices A 302, B 304 and C 306. FIG. 3*c* presents the completion of the modifications to be made to the topology map to resolve all anomalies. A fourth virtual port is generated on the virtual device 310 and linked to Device D, port 2 308. With the addition of this link, all anomalies have been removed from the topology map and the missing device 310 is determined to be a device with four ports facilitating communication between Devices A 302, B 304, C 306, and D 308. The main link table for this topology is presented below in Table 5:

TABLE 5

| Source name | Source port | Destination name | Destination port |
|---|---|---|---|
| A | 1 | V | 2 |
| B | 1 | V | 1 |
| C | 2 | V | 3 |
| D | 2 | V | 4 |
| V | 1 | B | 1 |
| V | 2 | A | 1 |
| V | 3 | C | 2 |
| V | 4 | D | 2 |

Figure 4:
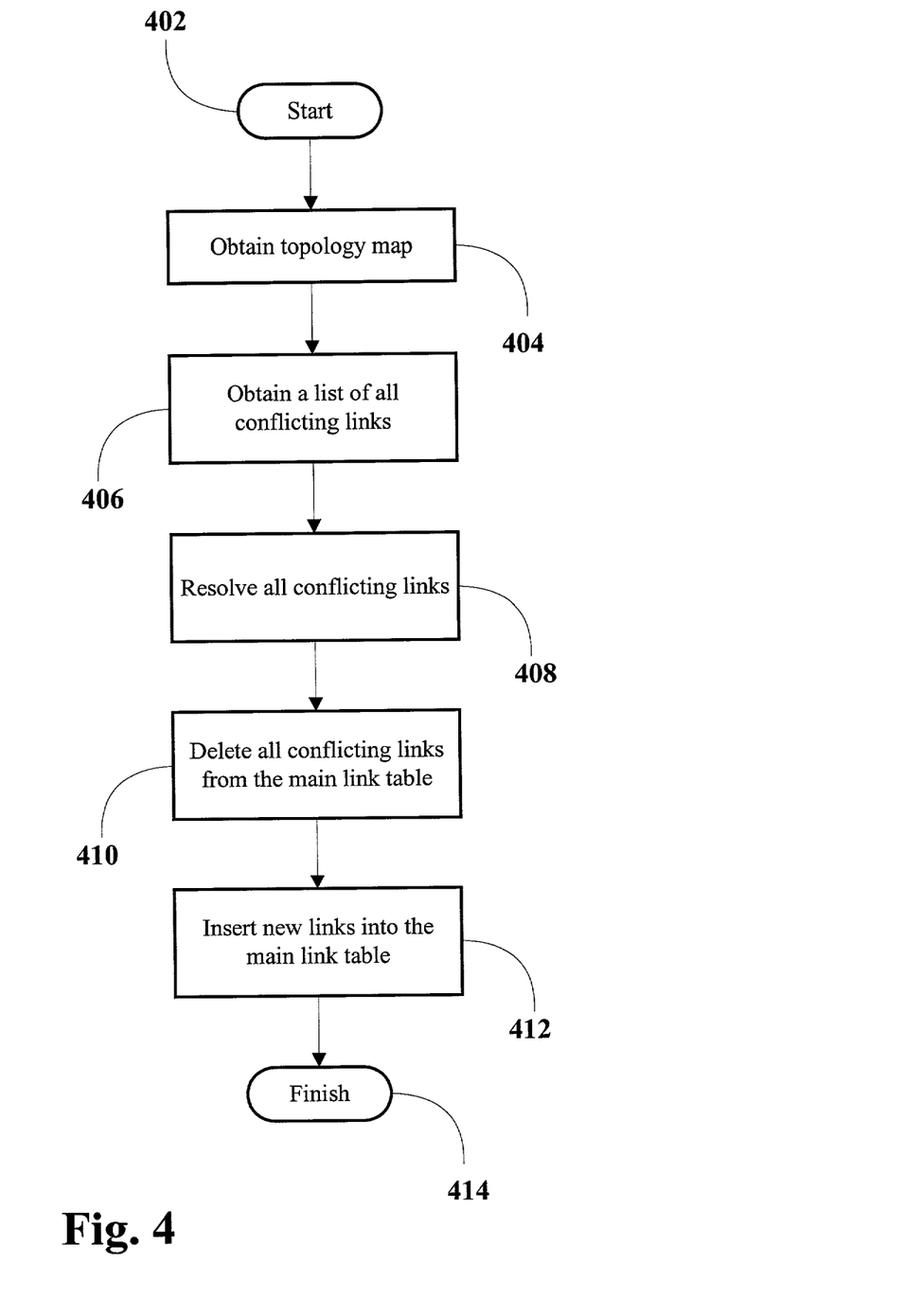
FIG. 4 is a flow diagram presenting a high-level view of a method for resolving anomalies in a topology map according to one embodiment of the present invention.

A method of the present invention, intended to be executed by a program running on a computer system comprising a programmable microprocessor, is presented in the high-level flow diagram of FIG. 4. The method starts, step 402, by obtaining a topology map of the network, step 404. Although many techniques may be used to derive the topology map required by step 404, one embodiment contemplates deriving a topology map according to the '702 patent, which has previously been incorporated by reference.

The topology map is analyzed to obtain a list of all conflicting links in the topology map, step 406. For a link to be conflicting, a source must have two or more links in the link table. The links for a given source (device and port) are considered conflicting if they have different destinations. This follows from the observation that a link represents a physical connection between two ports. It is not possible for a port to be connected to more than one port simultaneously.

Therefore, if a port is connected to more than one port there is a device missing from the topology.

All the conflicting links are resolved to eliminate anomalies, step 408. A virtual device is used to represent either a single missing device, one or more directly connected missing devices, or a broadcast media. A virtual device links table is generated as a temporary table to hold links between source and destination to the virtual devices. As will be explained in greater detail herein, it is determined which links must be replaced with links to the virtual device and entries are created in the virtual devices links table. All conflicting links are removed from the main link table, step 410, thereby removing all anomalies from the topography, and replaced with entries from the virtual device links table. In this manner, missing devices are now represented in the topography as one or more virtual devices, as well as the ports on the virtual device physically connected to other nodes (devices) in the network.

Figure 5:
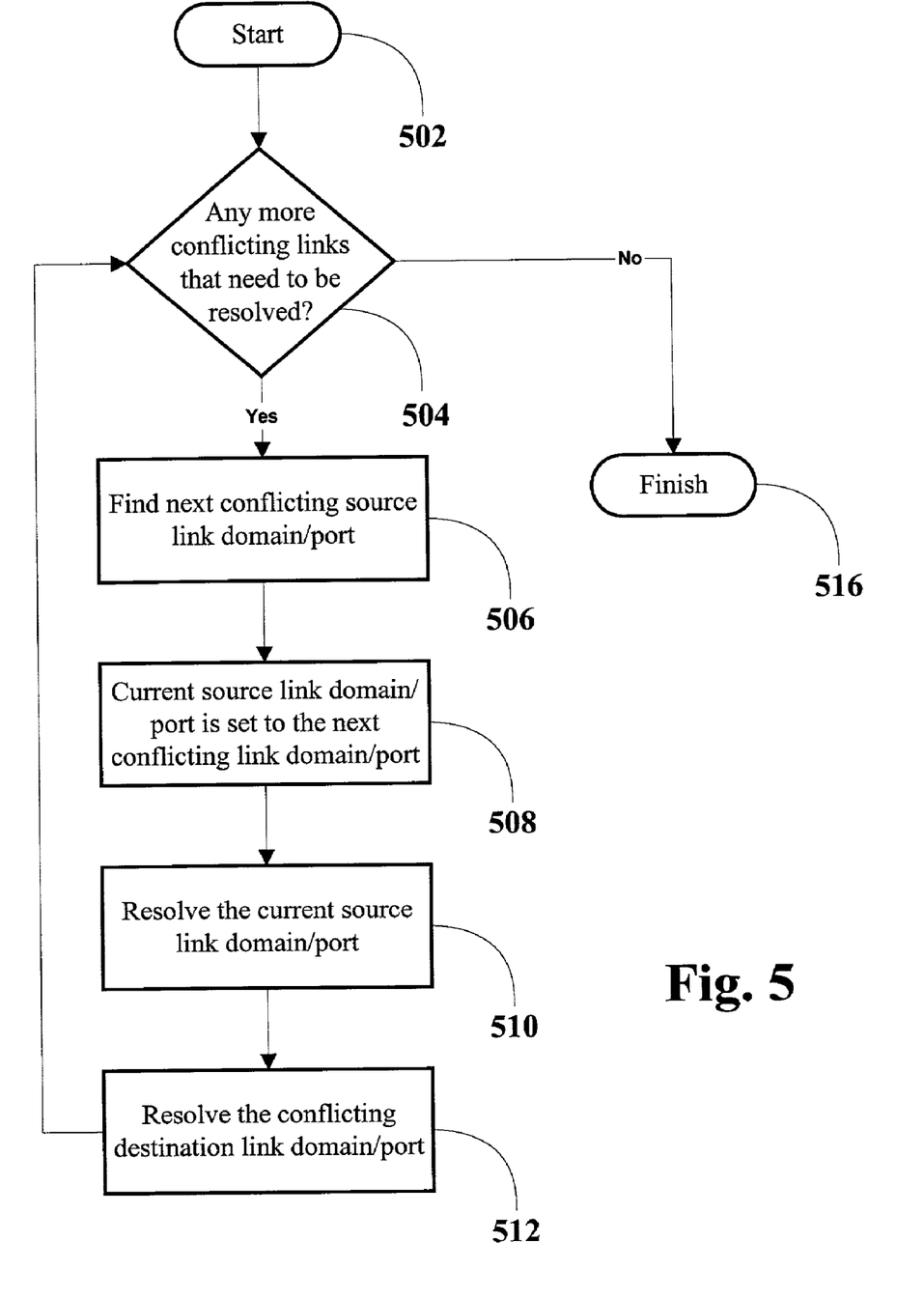
FIG. 5 is a flow diagram presenting a method for resolving conflicting links in a topology map, according to one embodiment of the present invention.

FIG. 5 comprises the routine executed to complete step 408 presented in FIG. 1: resolve all conflicting links. The subroutine begins, step 502, with an examination of the topology map to determine if there are any conflicting links in the topology that must be resolved, step 504. Where additional links require resolution, the next conflicting port is retrieved from the master link table, step 506. According to other embodiments, the next conflicting link is determined by examining the topology map itself. The current source port is set to the next conflicting port, step 508.

The current source and destination ports are resolved, steps 510 and 512 respectively. Because each conflicting destination occupies a distinct record in the master link table, each must be individually resolved. Program flow returns to step 504 where a determination is once again made to ascertain whether or not additional conflicting links need to be resolved, step 504. The process is repeated until all conflicting links are resolved and the routine ends, step 516.

Figure 6:
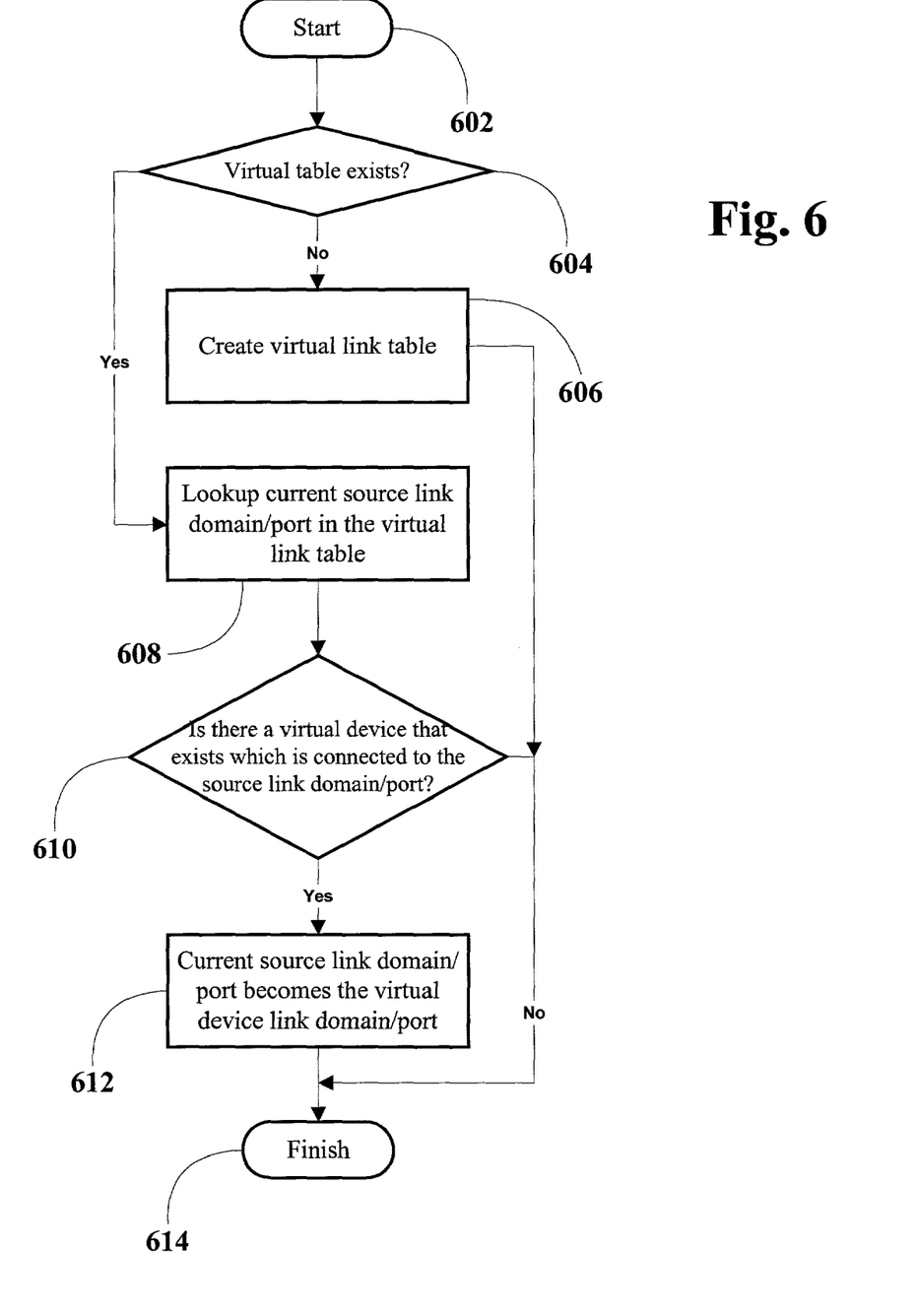
FIG. 6 is a flow diagram presenting a method for resolving the source link domain and port at an anomalous point in a topology map according to one embodiment of the present invention.

Within the context of the routine to resolve all conflicting links contained within the topology map, FIG. 5, a subroutine is entered at step 510, presented in FIG. 6, to resolve the source link domain and port. The subroutine starts, step 602, and a check is performed to determine if a virtual link table exists, step 604. The virtual link table is a temporary table generated in a memory of the computer system, e.g., transient or persistent memory systems typically integrated with computer systems, and is used to keep track of links from discovered network devices to a virtual device or devices that represent a device or devices missing from the topology received at step 404 in FIG. 4. Where the subroutine is executed for the first time, the virtual link table does not exist, step 604, so it must be created and stored in memory, step 606. The table is created, step 606, and the subroutine exits, step 614, returning control to the parent or calling routine.

On successive iterations of the subroutine of FIG. 6, the virtual link table has been created during a previous iteration, and the check performed at step 604 returns true. The virtual link table is examined, step 608, in an attempt to identify the link domain port previously set as the current source port in step 508 of FIG. 5. A check is performed on the lookup results to determine if a virtual device exists that is connected to the current source port, step 610. If no such virtual device exists, the subroutine exits, step 614, returning control to the parent or calling routine. Where a virtual device exists that is connected to the current source port, step 610, the current source port is set to the port on the virtual device to which the current source port is connected, step 612, and the subroutine exits, step 614, returning control to the parent or calling routine.

Control returns to the calling routine presented in FIG. 5 with processing continuing to step 512. The subroutine executed to resolve the conflicting destination link domain and port, step 512, is presented in FIG. 7. The subroutine begins, step 702, and an initial check is performed, step 704, to determine if any more conflicting destination links are present in the topology map. Where conflicting destination ports exist, the current destination port is set to be the next conflicting destination port from the set of conflicting destination ports, step 706. The virtual link table is examined in an attempt to identify the current destination link from the set of links comprising the virtual link table, step 708.

Figure 7:
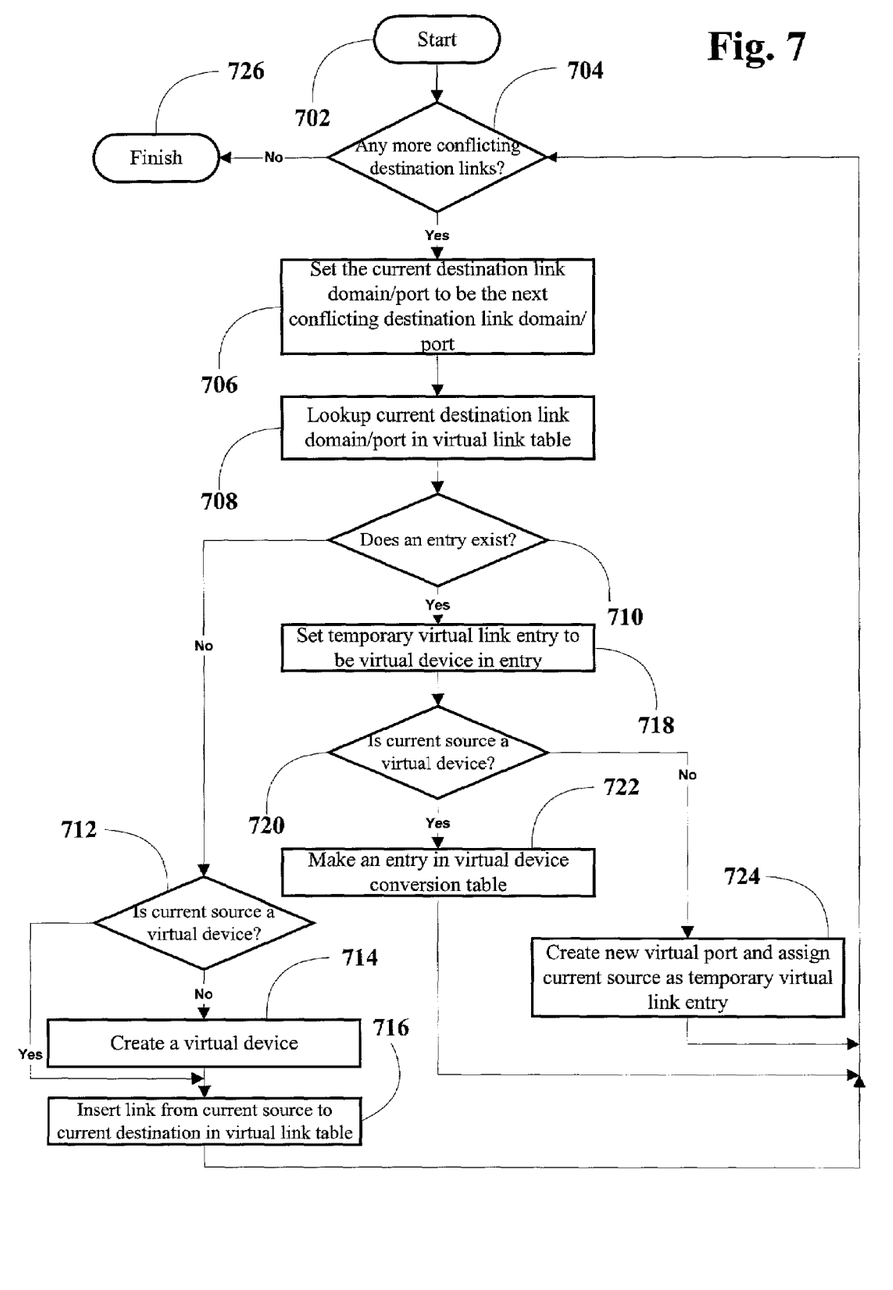
FIG. 7 is a flow diagram presenting a method for resolving the destination link domain and port at an anomalous point in a topology map according to one embodiment of the present invention.

If an entry does not exist in the virtual link table for the current destination, step 710, a check is performed to determine if the device set as the current source is a virtual device, step 712. Where the current source is not a virtual device, step 712, a virtual device is created, step 710. Regardless of whether the current source is a virtual device, step 712, a link is inserted in the virtual link table from the device and port identified as the current source to the device and port identified as the current destination, step 716. Program flow returns to step 704 and the set of conflicting destination links is examined to determine if additional conflicting destination links exist.

Returning to step 710, a check is performed to determine if an entry for the device and port identified as the current destination exists in the virtual link table, step 710. Where an entry exists for the current destination, step 710, a temporary entry is set in the virtual link table for the virtual device, step 718. Another check is performed, step 720, to establish whether the device and port set as the current source is a virtual device. If the current device is a virtual device, step 720, an entry is made in the virtual device conversion table recording the current source and the current destination, step 722. According to this situation, both the current source and the current destination are virtual devices. As will be explained in greater detail herein, the virtual device conversion table is used to record links between virtual devices for later merging or elimination of unnecessary or redundant virtual devices.

Where the current source is not a virtual device, step 720, a new virtual port is created on the virtual device and the temporary virtual link entry created in step 718 is updated to record the current source as the source for the virtual link entry, step 724. The virtual device is now used as the current source and program flow returns to step 704 where the set of conflicting destination links is examined to determine if any additional ones exist. The process is repeated until all the destination links are resolved, and the subroutine ends, step 726. Program flow returns to the calling routine, step 504 in FIG. 5.

Figure 8:
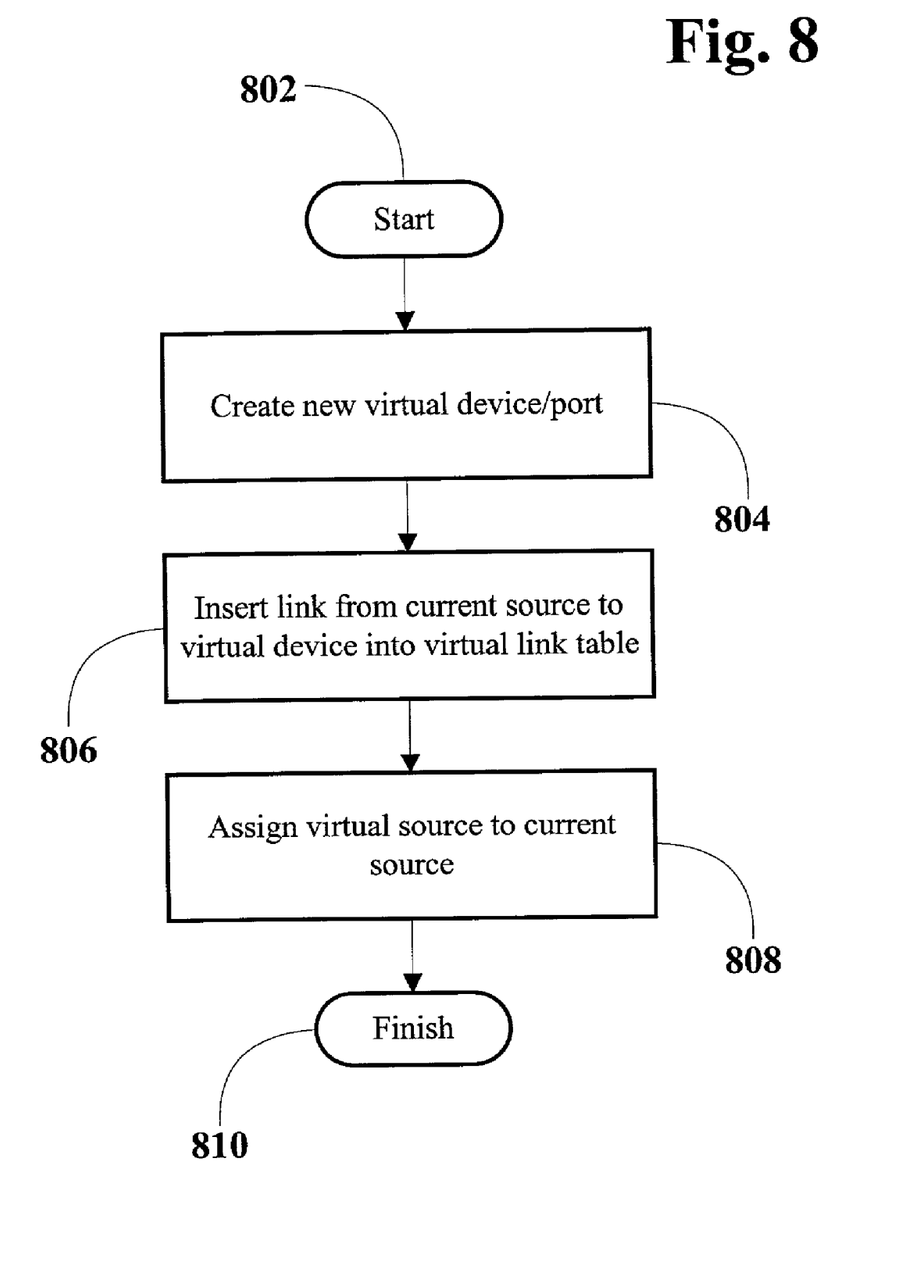
FIG. 8 is a flow diagram presenting a method for creating a new virtual port on a virtual device according to one embodiment of the present invention.

In the process of executing the subroutine presented in FIG. 7 to resolve the conflicting links contained in the topography map, several additional subroutines are called. The first of these subroutines is presented in FIG. 8, and is called when program flow reaches step 714 and a new virtual device is required. The subroutine of FIG. 8 begins, step 802, and a new virtual device is created in the memory of the computer system executing the routine, step 804. A link is entered into the virtual link table recording a connection between the current source and the virtual device, step 806. The newly created virtual device is set to be the current device, step 808, and the subroutine exits, step 810, returning control to the calling routine.

Figure 9:
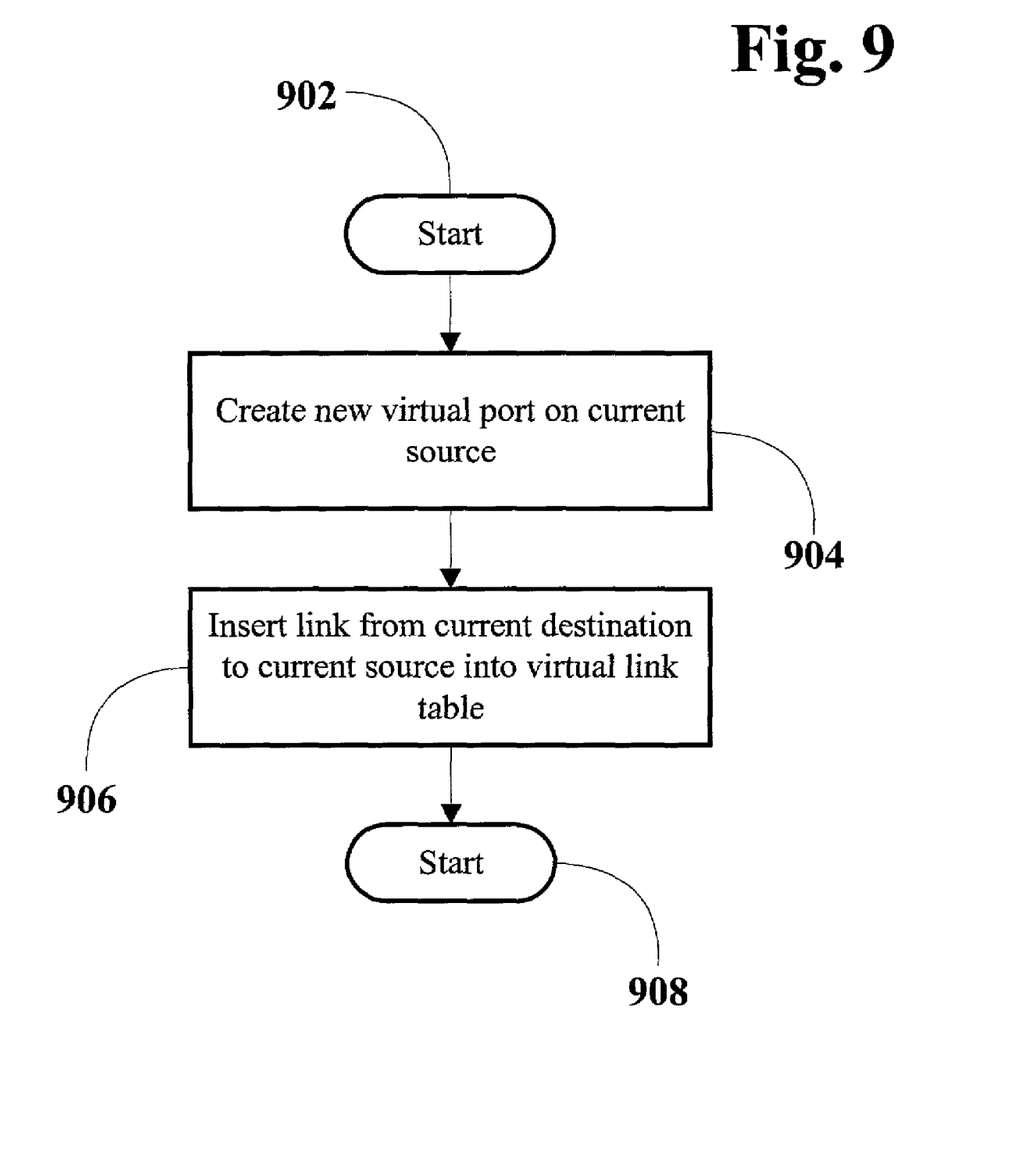
FIG. 9 is a flow diagram presenting a method for entering data into a virtual conversion table according to one embodiment of the present invention.

Program control returns to step 714 in FIG. 7 and continues with step 716, the subroutine of which is presented in FIG. 9. The subroutine presented in FIG. 9 is used to insert a link into the virtual link table from the device identified as the current source to the device identified as the current destination. The subroutine begins, step 902, and a new virtual port is created on the current source, step 904, which by definition of the program flow must be a virtual device. A entry is created in the virtual link table from the current destination to the current source, step 906, and the subroutine completes, step 908, with control being passed to the calling routine.

Figure 10:
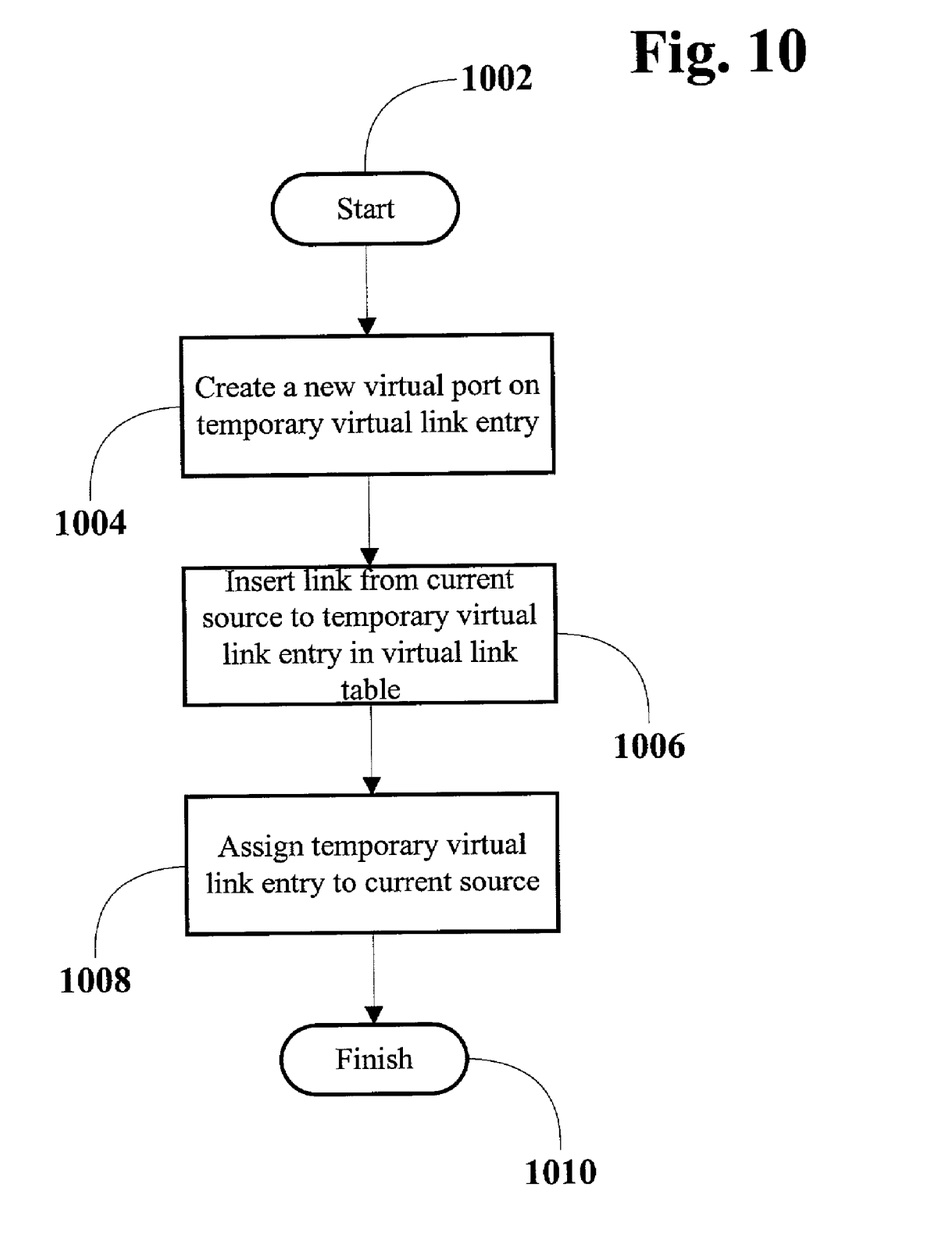
FIG. 10 is a flow diagram presenting a method for creating a virtual device according to one embodiment of the present invention.

Turning once again to FIG. 7, a check is performed at step 720 to determine if the current source is a virtual device. Where the current device is not a virtual device, program flow is directed to step 724, at which point the subroutine presented in FIG. 10 is executed to create a new virtual port and assign it as the current source for the temporary virtual link entry. The subroutine begins, step 1002, and a new virtual port is created and recorded in the virtual link table as a destination port within the temporary virtual link entry, step 1006. Inserting a link from the current source to the destination virtual port completes the entry, which is recorded in the temporary virtual link entry in the virtual link table, step 1006. The virtual port assigned as the destination port on the temporary virtual link entry is set to be the current source, step 1008, and the subroutine ends, step 1010, passing control back to the calling routine.

Figure 11:
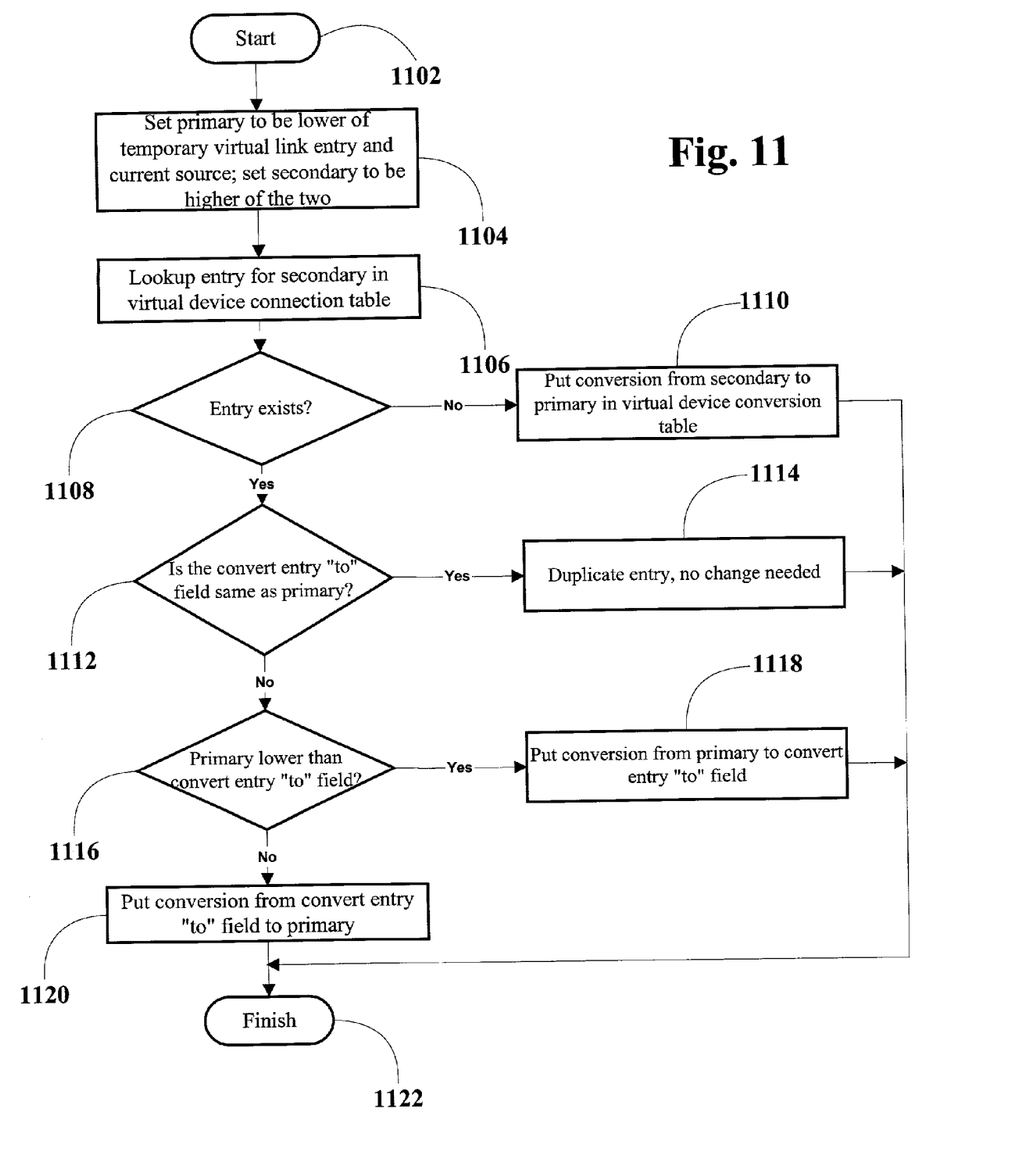
FIG. 11 is a flow diagram presenting a method for inserting a link into a virtual link table according to one embodiment of the present invention.

The final subroutine called by the routine presented in FIG. 7, presented in FIG. 11, is executed at step 722 to record connections between virtual devices for later resolution to eliminate unnecessary or redundant virtual devices. The subroutine begins, step 1102, and assigns two variable names to hold the two virtual link entries, step 1104. In this embodiment of the invention, a variable named "Primary" is used to hold the lower of the temporary virtual link entries and a variable named "Secondary" is used to hold the higher of the temporary virtual link entries, however, those skilled in the art will appreciate that other variable names could also be used. The subroutine then looks up "Secondary" in the virtual device conversion table, step 1106, to see if an entry for "Secondary" exists in the virtual device conversion table, step 1108. If an entry for "Secondary" does not exist, then the subroutine puts conversion from "Secondary" to "Primary" in the virtual device conversion table, step 1110, and the subroutine ends, step 1122, passing control back to the calling routine. If an entry for "Secondary" does exist in the virtual device conversion table, then the subroutine checks if the convert entry "to" field is same as "Primary", step 1112. If the convert entry "to" field is same as "Primary", then the subroutine determines that this entry is a duplicate entry with no change needed, step 1114, and the subroutine ends, step 1122, passing control back to the calling routine. If the convert entry "to" field is not the same as "Primary", then the subroutine checks if "Primary" is lower than the convert entry "to" field, step 1116. If "Primary" is lower than the convert entry "to" field, then the subroutine puts conversion from "Primary" to the convert entry "to" field in the virtual device link table, step 1118, and the subroutine ends, step 1122, passing control back to the calling routine. If "Primary" is not lower than the convert entry "to" field, then the subroutine puts conversion from the convert entry "to" field to "Primary", and the subroutine ends, step 1122, passing control back to the calling routine.

An exemplary virtual device conversion table generated by the instant subroutine, illustrating the interconnection between four virtual devices, is presented in Table 6 as follows:

TABLE 6

| From | To |
| --- | --- |
| virtual device 2 | virtual device 1 |
| virtual device 3 | virtual device 1 |
| virtual device 5 | virtual device 4 |
| virtual device 6 | virtual device 4 |

The final steps in the high level process of resolving ambiguities contained within a topology, presented in FIG. 4, concerns deleting conflicting links and replacing them with resolved links to virtual devices, steps 410 and 412. These steps are accomplished through the routine presented in FIG. 12. The routine starts, step 1202, and an initial check is performed to ascertain whether any entries are left in the virtual link table for inclusion in the main link table, step 1204. If entries remain in the virtual link table, step 1204, the next entry is retrieved from the table, step 1206.

Figure 12:
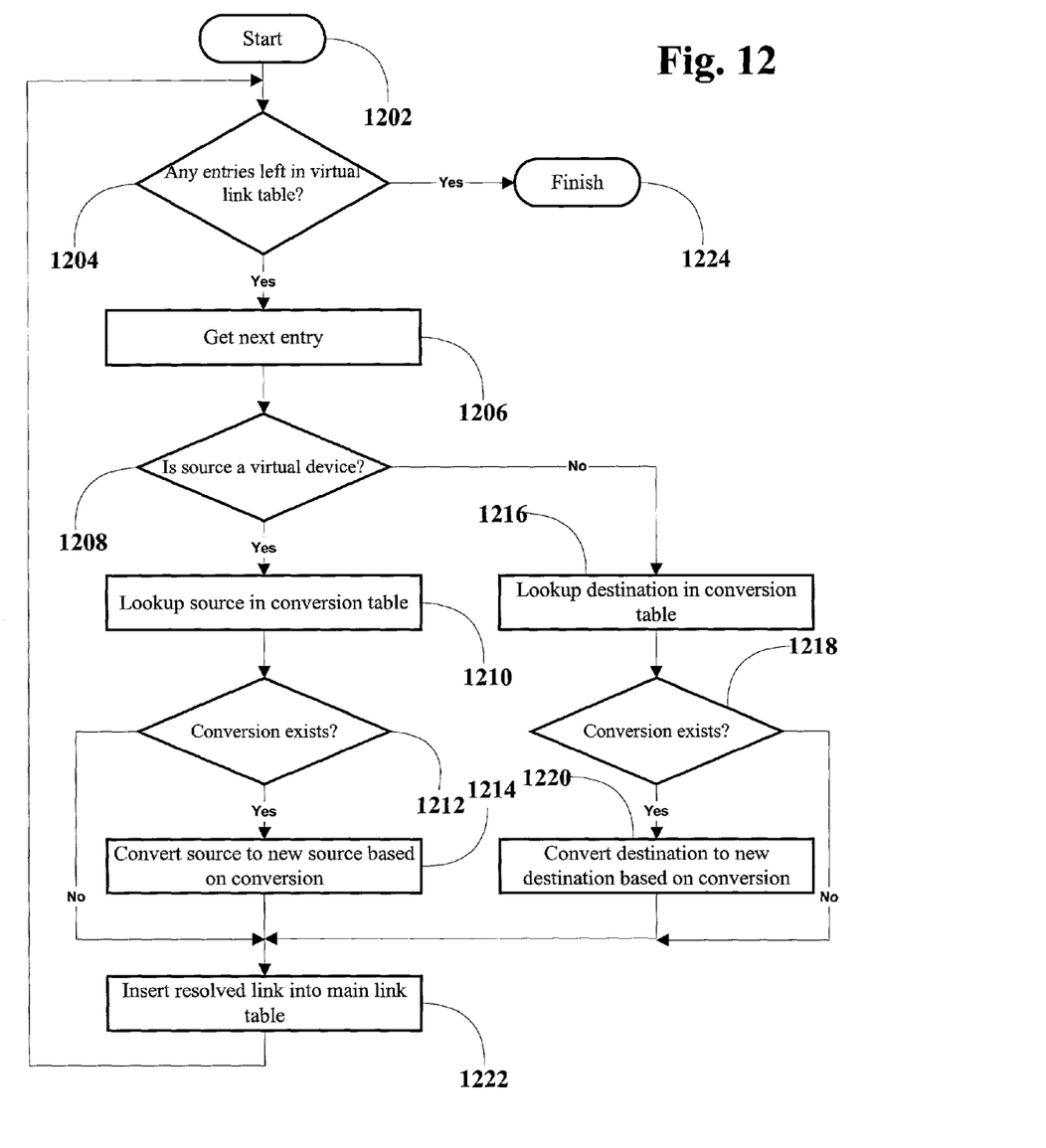
FIG. 12 is a flow diagram presenting a method for inserting a link into a main link table according to one embodiment of the present invention.

The next entry is retrieved, step 1206, and a check is performed to determine if the retrieved entry comprises a virtual device, step 1208. Where a virtual device is contained in the entry retrieved from the virtual link table, steps 1206 and 1208, the virtual conversion table is examined to determine if the source is contained therein, step 1210. Where the source device is listed in the conversion table, step 1212, a conversion is performed to convert the source retrieved from the virtual link table to a new source based on the data contained in the conversion table, step 1214. Regardless of whether the source is contained within the virtual conversion table, step 1212, the resolved link is inserted into the main link table and replaces the link previously contained within the main link table, step 1222.

Turning back to step 1208, where a virtual device is not contained in the entry retrieved from the virtual link table, program flow is directed to step 1216. The virtual conversion table is examined to determine if the destination port is contained therein, step 1216. Where the destination device is listed in the conversion table, step 1218, a conversion is performed to convert the destination retrieved from the virtual link table to a new destination based on the data contained in the conversion table, step 1220. Regardless of whether the destination is contained within the virtual conversion table, step 1212, the resolved link is inserted into the main link table and replaces the link previously contained within the main link table, step 1222. Program flow returns to step 1204 and a check is performed to ascertain whether any additional entries exist in the virtual link table for inclusion in the main link table. When all entries have been resolved, the routine exits, step 1224. Upon resolving the entries recorded in the virtual link table through the methods presented above, a resultant topology map is produced whereby anomalies contained within the map are eliminated.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for resolving anomalies within a network topology map, the method comprising:

identifying an anomaly including a conflicting link within a received topology map, the conflicting link comprising a source port on a network device and one or more conflicting destination ports on one or more other network devices;

resolving the conflicting link by inserting one or more virtual devices within the topology map, the one or more virtual devices being representative of one or more of the network devices not identified in the received topology map as linked to the source or destination ports wherein resolving the conflicting link comprises first determining whether the source or a destination in the conflicting link is linked to a first virtual device;

replacing the conflicting link with a resolved link to the one or more virtual devices based upon the resolution of the conflicting link wherein replacing the conflicting link with a link to a virtual device only if neither the source nor a destination is linked to the first virtual device; and wherein if a destination in the conflicting link is linked to a first virtual device, creating a link from the source to the first virtual device if the source in the conflicting link is not a virtual device.

2. The method of claim 1, wherein resolving the conflicting link comprises:

determining a number of conflicting destinations from the source of the conflicting link;

resolving the source of the conflicting link;

resolving the conflicting destination.

3. The method of claim 1, comprising identifying a link between two virtual devices; and merging the virtual devices.

4. The method of claim 1, wherein identifying the conflicting link comprises locating two or more entries in a link table showing the source to be linked to two or more different destinations.

5. The method of claim 4, comprising grouping together entries in the link table having the source into a conflict group.

6. The method of claim 4, wherein replacing the conflicting link with a link to the virtual device comprises removing the conflicting link from the link table and inserting the link to the virtual device in a virtual link table.

7. The method of claim 6, comprising generating a virtual link table for storing one or more links to virtual devices.

8. The method of claim 1 wherein determining whether the source or destination is linked to a virtual device comprising first determining whether the source is linked to a virtual device then determining whether a destination in the conflicting link is linked to a virtual device.

9. The method of claim 1, comprising, if the source is linked to a first virtual device, replacing the source with the first virtual device.

10. A computer readable medium storing a data structure representing a virtual link table, the data structure comprising:

one or more entries showing a link between a source device in a network and a first virtual device, the source device being identified in a received topology map of a network and the first virtual device not being identified in the received topology map;

one or more entries showing a link between a destination device in the network and the first virtual device, the destination device being identified in the received topology map;

the virtual link table data structure being used by an executable program to display an improved topology map of the network;

wherein the first virtual device is representative of one or more network devices not identified in the received topology map as linked to the source or destination ports;

wherein resolving the conflicting link comprises first determining whether the source or a destination in the conflicting link is linked to a first virtual device and replacing the conflicting link with a link to a virtual device only if neither the source nor a destination is linked to the first virtual device; and wherein if a destination in the conflicting link is linked to a first virtual device, creating a link from the source to the first virtual device if the source in the conflicting link is not a virtual device.

11. A system, comprising:

a processor;

at least one arrangement configured to communicate with the processor via a computer network;

a computer-readable storing medium storing a set of instructions, the set of instructions capable of being executed by the processor to implement a method for resolving anomalies within a network topology map, the set of instructions effective to perform the steps of:

identifying an anomaly including a conflicting link within a received topology map, the conflicting link comprising a source port on a network device and one or more conflicting destination ports on one or more other network devices;

resolving the conflicting link by inserting one or more virtual devices within the topology map, the one or more virtual devices being representative of one or more of the network devices not identified in the received topology map as linked to the source or destination ports wherein resolving the conflicting link comprises first determining whether the source or a destination in the conflicting link is linked to a first virtual device;

replacing the conflicting link with a resolved link to the one or more virtual devices based upon the resolution of the conflicting link wherein replacing the conflicting link with a link to a virtual device only if neither the source nor a destination is linked to the first virtual device; and wherein if a destination in the conflicting link is linked to a first virtual device, creating a link from the source to the first virtual device if the source in the conflicting link is not a virtual device.

12. An apparatus for resolving anomalies within a network topology map, the apparatus comprising:

a first arrangement effective to identify an anomaly including a conflicting link within a received topology map, the conflicting link comprising a source port on a network device and one or more conflicting destination ports on one or more other network devices;

a second arrangement effective to resolve the conflicting link by inserting one or more virtual devices within the topology map, the one or more virtual devices being representative of one or more network devices not identified in the received topology map as linked to the source or destination ports wherein resolving the conflicting link comprises first determining whether the source or a destination in the conflicting link is linked to a first virtual device; and a third arrangement effective to replace the conflicting link with a resolved link to the one or more virtual devices based upon the resolution of the conflicting link wherein replacing the conflicting link with a link to a virtual device only if neither the source nor a destination is linked to the first virtual device; and wherein if a destination in the conflicting link is linked to a first virtual device, creating a link from the source to the first virtual device if the source in the conflicting link is not a virtual device.

* * * * *